United States Patent [19]

Jechart

[11] 3,798,565

[45] Mar. 19, 1974

[54] GAS CELL ATOMIC FREQUENCY STANDARD OF COMPACT DESIGN

[76] Inventor: Ernst Jechart, Ishertstrasse 2, 8 Munich, Germany

[22] Filed: Dec. 14, 1972

[21] Appl. No.: 315,035

[30] Foreign Application Priority Data

Dec. 14, 1971 Germany............................ 2162050

[52] U.S. Cl......................................... 331/94, 331/3
[51] Int. Cl.............................................. H03b 3/12
[58] Field of Search.................................. 331/94, 3

[56] References Cited

UNITED STATES PATENTS

| | | | |
|---|---|---|---|
| 3,388,339 | 6/1968 | Malnar et al. | 331/3 |
| 3,248,666 | 4/1966 | Farmer | 331/94 |

*Primary Examiner*—H. K. Saalbach
*Assistant Examiner*—Siegfried H. Grimm
*Attorney, Agent, or Firm*—Bierman & Bierman

[57] ABSTRACT

An atomic frequency standard comprising a cell arranged in the radiation path between a light source and a light sensitive signal generating means. Both the light source and the cell contain alkali metal vapor. A cavity resonator surrounds the cell. Means are provided for coupling one resonator to a frequency controllable oscillator. Means for applying a static homogenous magnetic field to the cell are also provided. The device contains an oscillator feedback control system responsive to the increased light absorption occurring when resonator oscillations coincide with an electron transition of the alkali metal. The cell substantially completely fills the cavity resonator and follows its contours. At least one concavity is provided on the cell wall into which a projection extends to promote stable oscillation modes within the cell.

14 Claims, 2 Drawing Figures

GAS CELL ATOMIC FREQUENCY STANDARD OF COMPACT DESIGN

The invention relates to an atomic frequency standard having a cell arranged in the radiation path between a light source activated by alkali-metal vapour and a light sensitive signal generating means. The cell also contains the alkali-metal in vapour form. A cavity resonator is provided surrounding the cell and coupled to a frequency-controlled oscillator. Means for applying a static homogenous magnetic field to the cell are also provided as well as a feedback control system for controlling the oscillator in accordance with the signal generated by the light sensitive signal generating means. This system is responsive to the increased light absorption occurring when the resonator oscillations coincide with the electron transfer of the alkali metal.

Such atomic frequency standards are known and described in more detail in, for instance, German Pat. specification No. 1,143,453. As embodied in actual practice, they consist of large appliances taking up a considerable amount of room and being very heavy. These features are undesirable per se, and furthermore, they have an unfavourable influence on costs of production and also on the quality of the appliance itself, as a considerably increased expenditure is necessary for the application of thermostatic control.

The primary object of the invention is to reduce the dimensions of such an appliance and to provide a handy appliance of low weight, which nevertheless exhibits the desired quality, i.e. constant frequency, to the same degree as known appliances, or to an even higher degree. Various difficulties have to be taken into consideration when reducing the dimensions of such appliances. The volume of the cell itself should as far as possible not be reduced; because of chemical changes due to ageing, of the cell wall for instance, the cell properties deteriorate as time goes on, and this ageing effect becomes more marked in proportion as the ratio of the cell volume to the wall surface decreases.

Furthermore the volume of the cavity resonator cannot be reduced as desired, because for a given operating frequency, a given form of a stationary wave, known as a "mode," must form in the resonator. By incorporating a material with a high dielectric constant in the resonator its dimensions can be reduced, but then only a very small volume remains for the cell itself. Finally, with known appliance of this type, thermostatic devices taking up even more room have to be provided, along with the corresponding sheathings and insulation.

In accordance with the present invention, an atomic frequency standard of the kind mentioned above is characterized in that the cell fills the cavity resonator substantially completely and follows its contours. Furthermore, in at least at one place, preferably at two or more places located symmetrically to the axis or centre plane of the cell, the cell wall is provided with concavities of, for instance, funnel shape or cup shape, into which extend projections of metal or any insulating or semiconducting material with a high dielectric constant. These projections are connected to the wall of the cavity resonator.

Because of these projections, it becomes possible to generate in the cavity a special oscillatory mode which is stable, notwithstanding the considerably reduced dimensions of the resonator. As cup-shaped concavities are provided in the cell to accommodate these projections, they only take up a very small and negligible fraction of the total volume or irradiated cross-section of the cell, and the cell itself can substantially completely fill the space available in the cavity resonator.

The cavity resonator is preferably constructed as a cylinder, with an internal diameter of about 20 to 40 mm, preferably 25 to 30 mm, a length of about 25 to 45 mm, preferably 35 to 40 mm. Substantially in the middle of its length, two diametrically arranged pin type projections extending towards the cylinder axis are provided. These projections extend into the cavity up to about half, or at most about 80 percent, of the cylinder radius. For fine tuning at least one of the projections may be adjustable with respect to the depth to which it projects into the cell concavity. For considerations of mechanical stability, it is advantageous if the cavity resonator is formed so as to receive support from the cell, at least at the peripheral wall.

A further considerable saving in space can be obtained if the cavity resonator itself takes the form of a thermostat container. Means for generating the static magnetic field are provided, preferably in the form of at least one magnetic coil wound directly on the cavity resonator. Because the cavity resonator takes the form of a thermostat container, considerable advantages are obtained, but more severe demands are made with respect to the quality of the thermostat function because of the low resistance of the small resonator to thermal stress. It is possible to avoid becoming involved in a high outlay for thermostatic control arrangements, if advantage is taken of the fact that both variations in temperature and variations in the applied static magnetic field influence frequency deviations, these influences can be compensated by means of a suitable arrangement. In the preferred embodiment of the invention, means are provided for controlling the magnetic coil in accordance with the thermostatic heating current which varies with the external temperature.

By using the cavity resonator as the thermostat container, it becomes possible and particularly advantageous to arrange the light sensitive signal generating means, which acts as a light receiver, inside the cavity resonator also, thus on the one hand saving space and on the other hand excluding the influence of the external temperature on the light sensitivity of the light sensitive signal generating means. This stabilization of the light sensitive signal generating means can be utilized in a further advantageous variant of the invention to exclude further, either wholly or to a considerable extent, the known dependence of the frequency on variations in intensity of the light radiated out from the lamp. Utilizing a non-electrode gas discharge lamp filled with alkali-metal vapour which is also thermostically controlled, a fine control of the temperature of the lamp thermostat is achieved in accordance with the light yield of the thermostatically controlled light receiver.

The HF oscillations (microwave oscillations) generated by an oscillator can be coupled to the cavity resonator by means of capacitor and a "snap-off" diode. A particularly advantageous construction of the capacitor, adapted to the restricted dimensions of the cavity resonator, is obtained if the capacitor takes the form of two plates forming a double wall of the cavity resonator arranged directly against, or at a slight distance from the end face wall of the cell. Each plate is provided with a port or window for the passage of rays between the light source and the light receiver. Advantageously, a light-permeable dielectric, such as mica, is provided between the capacitor plates. This dielectric can extend completely over the port or window and thus prevent any convection between the interior of the cavity resonator and the outer air.

A preferred embodiment of the invention is described in more detail below with reference to the drawings.

Figure 1:
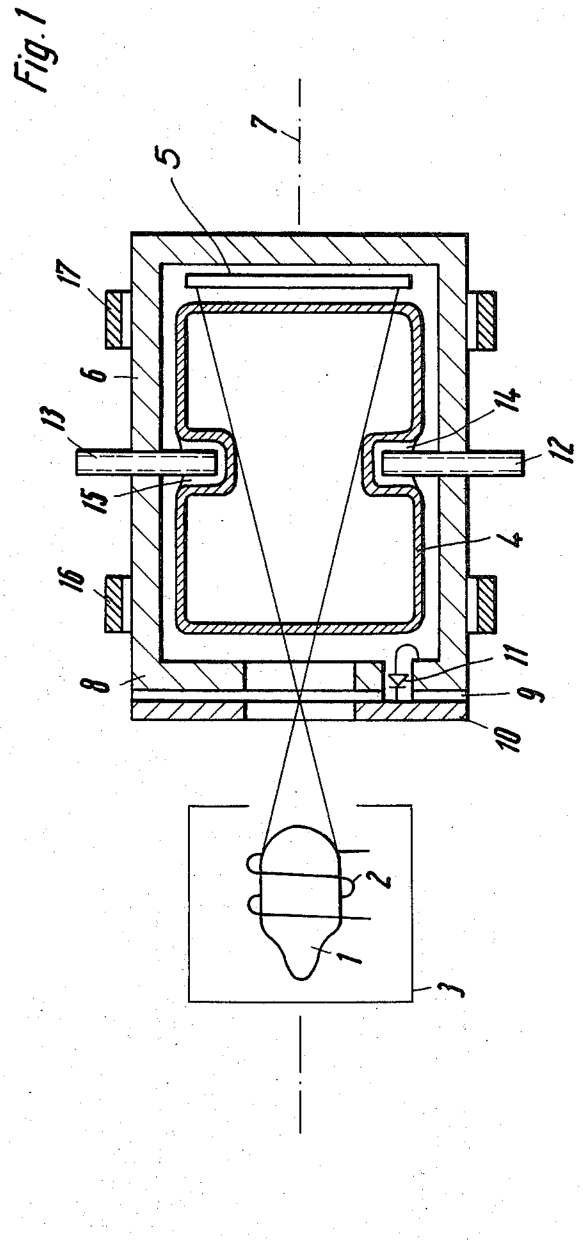
FIG. 1 is a cut-away plan view of the device showing the reciprocal arrangement of lamp, resonator, cell and light receiver.

In the embodiment illustrated in FIG. 1, a non-electrode gas discharge lamp 1, which is evacuated and filled with the desired alkali metal vapour, e.g. rubidium, at a suitable vapour pressure, is surrounded by an exciter coil 2 and arranged in a thermostat 3, which produces the elevated temperature (e.g. 100° C) required for generating the requisite vapour pressure in the lamp. The thermostat 3 keeps the vapour temperature constant within narrow limits, as the light output of the lamp is dependent on variations in temperature and hence in gas pressure.

The light radiated out from the lamp 1 arrives at a light receiver 5 after traversing a cell 4 positioned between lamp 1 and light receiver 5. The cell 4 consists of an evacuated cylindrical glass bulb, which is likewise filled with the vaporized alkali metal (e.g. rubidium) at a suitable vapour pressure and also with one or more brake or buffer gases. The light receiver 5 may, for instance, be a photosemiconductor element. The light receiver 5 and cell 4 are tighly enclosed (the distance shown in the drawing is exaggerated) by a metallic cavity resonator 6 which is likewise cylindrical in relation to the axis 7. The front end face wall 8 of the cavity resonator forms, together with a plate 10 placed in front of the wall 8 and a light-permeable dielectric 9 sandwiched between the wall 8 and plate 10, a capacitor, whose two plates are connected by a multiplier diode 11, e.g. a snap-off diode or a capacitance diode. The two capacitor plates 8 and 10 each have a window for the passage of the light radiation. The dielectric 9, however, extends completely across the window so that the interior of the cavity resonator 6 is completely sealed from the outer air and thus acts as a thermostat container. To produce the thermostatic action heater coils (not shown) or the like can be provided. In this way the light receiver 5 and snap-off diode 11 are thermostatically controlled in an advantageous manner.

Starting from the peripheral wall of the cavity resonator 6, two pin type projections 12, 13, made of metal or material with high dielectric constant having preferably a value greater than "5" lie diametrically and symmetrically opposite one another. These projections 12, 13 take the form of single screws, extending into cup-shaped concavities 14, 15 provided in cell 4 to accept projections 12, 13. These pins or screws 12, 13, which are adjustable for fine tuning, ensure that in the cavity resonator a special oscillation mode and preferably the magnetic $H_{111}$ -mode is produced which permits a reduction of the overall dimensions of the resonator. Due to the concavities 14, 15 only a negligibly small proportion of the total volume is required for the pins 12, 13, so that the cell can fill practically the whole remaining interior space of the resonator 6.

Two magnetic coils 16, 17 are provided for generating an homogeneous static magnetic field, directed substantially parallel to the direction of the light. Coils 16, 17 are preferably wound directly on to the cylindrical resonator.

The mode of operation of the apparatus and also other special features, will be described in connection with the block circuit diagram in FIG. 2.

Figure 2:
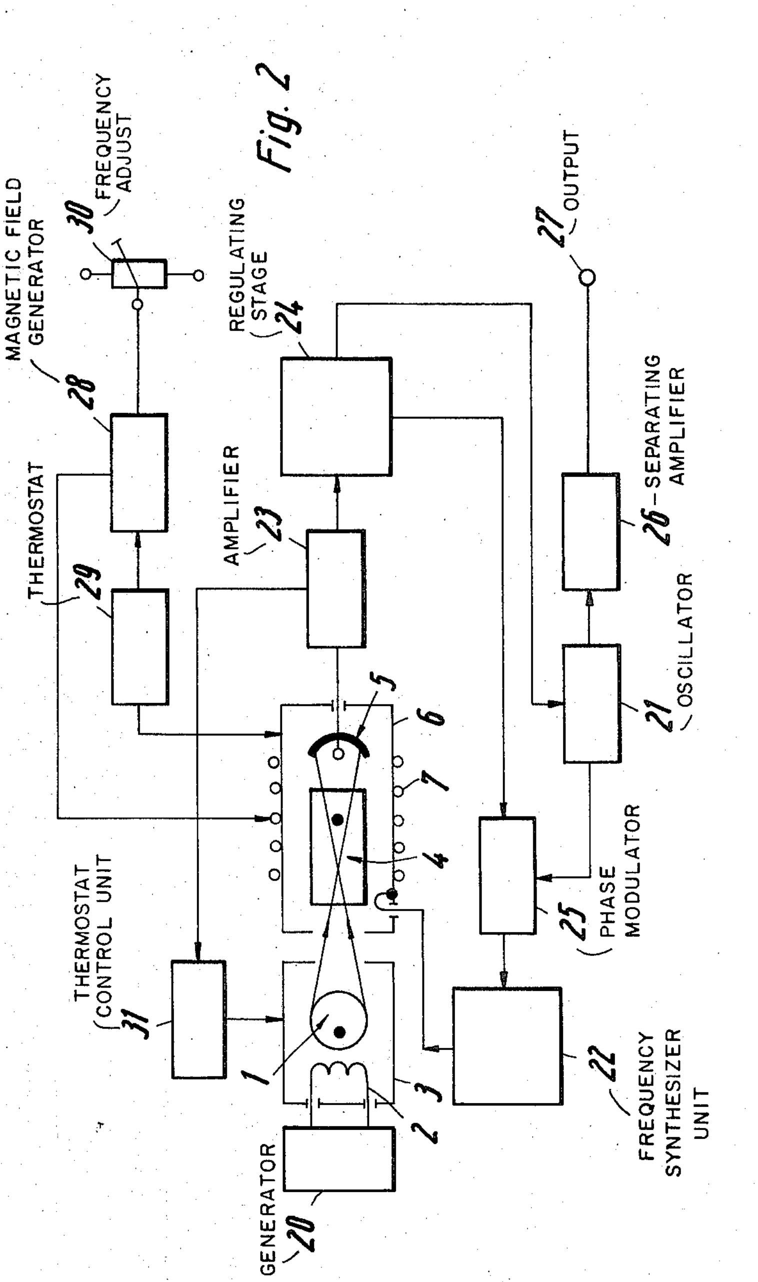
FIG. 2 is a schematic block circuit diagram of the complete appliance.

Like reference numerals in FIGS. 1 and 2 refer to like or corresponding parts. However the parts in FIG. 2 are only diagrammatically represented and differ to some extent from the actual conditions of arrangement and size, which can be better understood from FIG. 1.

The functional principle of the appliance and its theoretical basis are assumed as known and therefore will not be here explained in more detail. Reference is made to the relevant literature (e.g. Proceedings of the IEE, Jan., 1963, pp. 190–202, and German Pat. specification No. 1,143,453). As the actual frequency standard there is utilized the atomic inherent frequency, corresponding to the difference in energy between the two hyperfine structure levels of the original (basic) state of the rubidium atoms (and in fact of the isotope Rb 87). This frequency lies at about 6.8 GHz. The light radiated out by the lamp 1 actuated by the generator 20 is absorbed by the rubidium atoms in the cell by resonance absorption and brings there atoms into the excited condition. The oscillations generated by a quartz oscillator 21 by means of a frequency synthesizing unit 22 which converts the oscillations of quartz oscillator 21 into a frequency in the cavity resonator 6 that induces, when resonance occurs with the above-mentioned atomic inherent frequency, the hyperfine structure transition, i.e. the reversal of direction of the electron spin in relation to the nuclear spin. In this way, the readiness of the atoms for light absorption is further increased, the light receiver 5 receives a smaller intensity, and these variations in intensity are utilized by means of an amplifier 23 and a regulating stage 24 for re-adjusting the quartz oscillator 21. Through low frequency phase modulation of the high frequency oscillations, accomplished by means of a phase modulator 25, it is also possible to obtain, from the phase of the signals obtained at the light detector 5, regulating information necessary to determine the direction of the particular tuning of the quartz oscillator.

In this way, frequency of the quartz oscillator is continuously tuned with reference to the atomic inherent frequency, and can be tapped off means of a separating amplifier 26, which preferably also has frequency subdivision stages at an output 27 e.g. such as a 10 MHz frequency. To improve the signal condition, the cell 4 is further exposed to a static and homogeneous magnetic field created by a coil 7 by means of a magnetic field generator 28.

The cavity resonator 6 is thermostatically controlled by means of a thermostat 29. From the thermostat 29 a regulating signal, e.g. proportional to the heating current, can be fed to the magnetic field generator 28, in order to produce, when temperature variations occur, corresponding variations in the static magnetic field. In this way the temperature-dependent variations of the resonance frequency can be compensated by the variations dependent on the magnetic field. Thus, the influence of the temperature variations on the accuracy of the frequency can be considerably reduced.

An adjusting member 30 acting on the magnetic field generator 28 can be provided for a fine adjustment of the frequency, if desired. For further improvement of the constancy of the frequency, there is obtained from the amplifier 23, which amplifies not only the alternating current portion but also the direct current portion of the current tapped from the photocell 5, a regulating signal corresponding to this direct current portion, by which the lamp thermostat 31 regulating the temperature of the lamp 1 is controlled. In this way there is effected indirectly an influencing of the light intensity radiated out from the lamp 1, and thus intensity-dependent variations in frequency in the cell 4 can be compensated.

In the arrangement described, it was possible to produce an atomic frequency standard operating with the hyperfine basic transition of Rb 87, with a constancy of frequency at least comparable to that of known appliances. In addition, the device has overall dimensions of little more than 10 × 10 × 10 cc. The extraordinary advantages obtained with respect to space required, weight, and cost, as well as the shortening of the warming-up period, are obvious. Deviations from the form of embodiment described are of course possible. The cross-section of the cell and the cavity resonator need not be circular, but could also be square. Furthermore, instead of two dimetrically arranged pins 12, 13 there could also theoretically be used a single pin or a number of symmetrically arranged pins, in order to generate stable oscillation modes even with the small dimensions of the resonator. The pins could also consist of a material with a high dielectric constant. The action of the thermostat on the magnetic field could also be attained by leading part of the heating current directly through the magnetic coil 7. The concavities of the cell could also be arranged outside the longitudinal centre of the cell or extensively over the whole length of the cell.

It is to be understood that may modifications to the above-described invention may be made by those skilled in the art, and it is intended to cover all such modifications which fall within the spirit and scope of the appended claims.

What is claimed is:

1. An atomic frequency standard comprising a cavity resonator, a cell containing alkali metal in (vapour) vapor form, said cell being located within, substantially filling and being formed to follow the interior contours of said resonator, a light source containing alkali metal in (vapour) vapor form located on one side of said cell and light sensitive signal generating means on the other side of said cell such that a radiation path is formed from said light source, through said cell to said light sensitive signal generating means, a frequency controllable oscillator, means for coupling said oscillator to said resonator, means for applying a static homogeneous magnetic field to said cell, an oscillator feedback control system responsive to the signal generated by said light sensitive signal generating means for tuning said oscillator to the increased light absorption occurring when the oscillations of the resonator coincide with an electron transition of the alkali metal, at least one concavity on said cell wall and at least one projection of (metal or) a material selected from the group consisting of a metal, an insulator and a semiconductor, (with) said insulator and semiconductor having a high dielectric constant, said material extending from the wall of the resonator into said concavity such that stable oscillation modes are promoted within said cell.

2. An atomic frequency standard as claimed in claim 1, wherein said cavity resonator is formed as a cylinder with a diameter of about 25 to 40 mm.

3. The atomic frequency standard according to claim 2 comprising at least two concavities on said cell wall, said concavities being arranged substantially in the center of the length of said resonator and diametrically opposed to one another.

4. The atomic frequency standard according to claim 3 wherein each of said concavities has extending therein a projection, said projections extending into said concavities less than 80 percent of the radius of said cylinder.

5. The atomic frequency standard according to claim 4 wherein said projections extend into said concavities less than 50 per cent of the radius of said cylinder.

6. The atomic frequency standard as claimed in claim 3 wherein at least one of the projections is adjustable in respect of its length.

7. The atomic frequency standard as claimed in claim 1 wherein the cell is arranged in the cavity resonator in such a way as to be supported at least by its peripheral wall.

8. The atomic frequency standard as claimed in claim 1 further comprising a thermostat for keeping the temperature of said cell at a constant elevated temperature.

9. The atomic frequency standard as claimed in claim 1 wherein said means for generating the static magnetic field comprises at least one magnetic coil wound directly on to the cavity resonator.

10. The atomic frequency standard as claimed in claim 8 further comprising means responsive to the said cell thermostat for controlling the magnitude of the applied magnetic field.

11. An atomic frequency standard as claimed in claim 10, characterized in that the light sensitive signal generating means is arranged in the thermostatically controlled interior of the cavity resonator.

12. An atomic frequency standard as claimed in claim 1 wherein said light source is a heatable thermostatically-controlled gas discharge lamp and means for adjusting the temperature of said lamp in accordance with the signal from the light sensitive signal generating means.

13. An atomic frequency standard as claimed in claim 1 further comprising a cavity resonator having double walls and wherein said means for coupling the oscillator to the cavity resonator comprises a capacitor and a diode, said capacitor having the double walls of the cavity as its plates with said diode being connected therebetween and having a port or window for the radiation between the light source and said light sensitive signal generating means.

14. An atomic frequency standard as claimed in claim 13, wherein a light-permeable dielectric is situated between the capacitor plates and extends over the window thereby preventing any convection between the interior of the cavity resonator and the outer air.

* * * * *

UNITED STATES PATENT OFFICE

CERTIFICATE OF CORRECTION

PATENT NO. : 3,798,565

DATED : March 19, 1974

INVENTOR(S) : Ernst Jechart

It is certified that error appears in the above-identified patent and that said Letters Patent are hereby corrected as shown below:

Claim 1, lines 2 and 6, cancel "(vapour)".

Claim 1, line 20, cancel "(metal or)".

Claim 1, line 22, cancel "(with)".

Signed and Sealed this

*twenty-fifth* Day of *November 1975*

[SEAL]

*Attest:*

RUTH C. MASON
*Attesting Officer*

C. MARSHALL DANN
*Commissioner of Patents and Trademarks*